US012704312B2

(12) United States Patent
Son et al.

(10) Patent No.: US 12,704,312 B2
(45) Date of Patent: Aug. 11, 2026

(54) REFRIGERATOR DOOR HAVING VACUUM INSULATION ASSEMBLY AND METHOD FOR MANUFACTURING THE SAME

(71) Applicant: LG ELECTRONICS INC., Seoul (KR)

(72) Inventors: Joong Han Son, Seoul (KR); Jung Hun Kim, Seoul (KR); Jung Il Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 334 days.

(21) Appl. No.: 18/035,023

(22) PCT Filed: Nov. 1, 2021

(86) PCT No.: PCT/KR2021/015603

§ 371 (c)(1),
(2) Date: May 2, 2023

(87) PCT Pub. No.: WO2022/092975

PCT Pub. Date: May 5, 2022

(65) Prior Publication Data

US 2023/0400245 A1 Dec. 14, 2023

(30) Foreign Application Priority Data

Nov. 2, 2020 (KR) ........................ 10-2020-0144610

(51) Int. Cl.
*F25D 23/02* (2006.01)
*F16L 59/02* (2006.01)

(52) U.S. Cl.
CPC ............ *F25D 23/028* (2013.01); *F16L 59/02* (2013.01); *F25D 23/02* (2013.01);
(Continued)

(58) Field of Classification Search
CPC .... F25D 23/028; F25D 23/02; F25D 2201/14; F25D 2323/023; F25D 23/025;
(Continued)

(56) References Cited

U.S. PATENT DOCUMENTS

2011/0095669 A1 4/2011 Moon et al.
2012/0073317 A1 3/2012 Lee et al.
(Continued)

FOREIGN PATENT DOCUMENTS

CN 106679293 A 5/2017
CN 107850381 A 3/2018
(Continued)

*Primary Examiner* — Hiwot E Tefera
(74) *Attorney, Agent, or Firm* — Birch, Stewart, Kolasch & Birch, LLP

(57) ABSTRACT

The present invention relates to a refrigerator door having a vacuum insulation assembly and a method for manufacturing the same, including a first door body and a second door body coupled to each other to form the exterior of the door. A heat insulating space is formed between the first door body and the second door body, and the vacuum insulation assembly is installed in the heat insulating space. A sealed vacuum chamber is formed inside the vacuum insulation assembly, and the edge of the vacuum insulation assembly can be surrounded by a foam filled part. As such, the vacuum insulation assembly is installed inside the refrigerator door, and the vacuum insulation assembly has high insulation performance, and thus can replace the existing foam filled part, and therefore, the thickness of the refrigerator door can be reduced.

14 Claims, 13 Drawing Sheets

(52) U.S. Cl.
CPC ...... *F25D 2201/12* (2013.01); *F25D 2201/14* (2013.01); *F25D 2323/023* (2013.01)

(58) Field of Classification Search
CPC .... F25D 23/06; F25D 2201/12; F25D 19/006; F25D 2201/126; F25D 2400/04; F16L 59/065; F16L 59/02; F16L 59/08; B29L 2031/7622; B29L 2031/724; B29C 44/18
See application file for complete search history.

(56) References Cited

U.S. PATENT DOCUMENTS

| | | | | |
|---|---|---|---|---|
| 2018/0224193 | A1* | 8/2018 | Jung | F25D 19/006 |
| 2018/0292127 | A1* | 10/2018 | Park | F25D 27/005 |
| 2019/0101320 | A1* | 4/2019 | Dherde | F25D 23/069 |
| 2019/0257571 | A1* | 8/2019 | Park | F25D 23/028 |
| 2019/0360745 | A1* | 11/2019 | Lee | G02B 6/0065 |
| 2019/0383551 | A1* | 12/2019 | Choi | F25D 23/02 |
| 2020/0248955 | A1* | 8/2020 | Kim | F16L 59/02 |
| 2021/0325104 | A1* | 10/2021 | Kang | F25D 27/005 |
| 2022/0003489 | A1* | 1/2022 | Kim | F25D 23/04 |

FOREIGN PATENT DOCUMENTS

| | | | | |
|---|---|---|---|---|
| CN | 111750604 | A | 10/2020 | |
| EP | 3378359 | A1 * | 9/2018 | A47F 3/0434 |
| JP | 2014-5997 | A | 1/2014 | |
| KR | 10-2007-0066557 | A | 6/2007 | |
| KR | 10-1410459 | B1 | 6/2014 | |
| KR | 10-2017-0016239 | A | 2/2017 | |
| KR | 10-2017-0016240 | A | 2/2017 | |
| KR | 10-2017-0016241 | A | 2/2017 | |
| KR | 10-2017-0016242 | A | 2/2017 | |
| KR | 10-2019-0018835 | A | 2/2019 | |
| WO | WO-2019027227 | A1 * | 2/2019 | F16L 59/02 |
| WO | WO-2019027231 | A1 * | 2/2019 | F16L 59/028 |

* cited by examiner

REFRIGERATOR DOOR HAVING VACUUM INSULATION ASSEMBLY AND METHOD FOR MANUFACTURING THE SAME

CROSS REFERENCE TO RELATED APPLICATIONS

This application is the National Phase of PCT/KR2021/015603 filed on Nov. 1,2021, which claims priority under 35 U.S.C. § 119(a) to Patent Application No. 10-2020-0144610 filed in the Republic of Korea on Nov. 2, 2020, all of which are hereby expressly incorporated by reference into the present application.

TECHNICAL FIELD

The present disclosure relates to a refrigerator door and, more particularly, to a refrigerator door having a vacuum insulation assembly therein and a method for manufacturing the same.

BACKGROUND ART

A vacuum insulator maintains a vacuum inside a part to suppress heat transmission. Since the vacuum insulator can reduce heat transmission by convection and conduction, the vacuum insulator is applied to a warming apparatus and a cooling apparatus. Meanwhile, although an insulation method differs depending on whether the method is applied for cooling or freezing, it was common for the insulation method applied to a conventional refrigerator to provide a foaming polyurethane insulation wall with a thickness of more than about 30 cm. However, the insulation wall has a problem for reducing an internal volume of the refrigerator.

In order to solve the above problem, US Patent Application Publication No. US2040226956A1 (patent document 1) disclosed provision of a vacuum insulation structure of a refrigerator, and Korean Patent Application Publication No. 10-2019-0013345 (patent document 2) disclosed a technique of installing a vacuum insulator in a wall of a refrigerator.

However, these related arts related to the vacuum insulator installed inside the wall of the refrigerator, and a refrigerator door requiring also heat insulation has a problem of difficult application of the vacuum insulator. The width of the inside space of the refrigerator door is relatively smaller than the width of the inside space of the wall, so installation of the vacuum insulator is difficult.

Specifically, a welded portion constituting an edge of the vacuum insulator is likely to interfere with other parts in the small internal space of the refrigerator door, and when the welded portion interferes with other parts, the welded portion is open, and there is concern that a vacuum state of the vacuum insulator may be released.

Furthermore, recently, the refrigerator door may have a double structure and, for example, a main door and a sub door are provided doubly, and when the sub door is opened, a sub storage compartment provided by the main door may be used. However, when the vacuum insulator is applied to the sub door, the thickness of the sub door becomes thin and the volume of the sub storage compartment can widen. However, in this case, a space through which cool air may be transmitted widens together with the sub storage compartment, and there is concern that dew formation occurs on a gasket installed between the two doors.

Furthermore, a radiant heat shield film may be installed inside the vacuum insulator to block radiant heat. In the case of the vacuum insulator applied to the refrigerator door, in a process of opening and closing the refrigerator door, the radiant heat shield film may be moved inside the vacuum insulator. As described above, movement of the radiant heat shield film may cause generation of noise, and quality degradation of the refrigerator.

DISCLOSURE

Technical Problem

The present disclosure has been made to solve the problems occurring in the related art as described above, and the present disclosure is intended to apply a vacuum insulation assembly inside a refrigerator door, and to prevent the vacuum insulation assembly from interfering with other parts inside the refrigerator door.

Another objective of the present disclosure is to restrict a flow path of cool air to prevent dew formation on a gasket even when a vacuum insulation assembly is applied to a refrigerator door to widen a storage space of the door.

Still another objective of the present disclosure is to fix a radiant heat shield film to prevent the radiant heat shield film constituting a vacuum insulation assembly from being moved in a process of opening and closing a refrigerator door.

Technical Solution

According to characteristics of the present disclosure for achieving the above-described objectives, a first door body and a second door body of the present disclosure may be coupled to each other to form the exterior of a refrigerator door. In addition, a heat insulating space may be formed between a first door body and a second door body, and a vacuum insulation assembly may be installed inside the heat insulating space. A sealed vacuum chamber may be provided inside the vacuum insulation assembly, and at least a part of an edge of the vacuum insulation assembly may be surrounded by a foam filled part. As described above, according to the present disclosure, the vacuum insulation assembly may be installed inside the refrigerator door, and since the vacuum insulation assembly has high insulation performance so that the vacuum insulation assembly may replace the existing foam filled part, and therefore, the thickness of the refrigerator door may be reduced.

The vacuum insulation assembly may include a coupling part provided along the edge of the vacuum insulation assembly to maintain a vacuum in the vacuum chamber of the vacuum insulation assembly, and at least a part of the coupling part may be surrounded by the foam filled part while being spaced apart from a peripheral part inside the heat insulating space. Then, interference between the peripheral part inside the door and the coupling part may be prevented, and removal of a vacuum state of the vacuum insulation assembly likely generated by the interference between the parts may be prevented.

Furthermore, the second door body may have a storage space formed in a direction of a storage compartment of the refrigerator, and a dyke part may protrude on a lower portion of the second door body forming a bottom of the storage space toward the storage compartment or the main door. At least a part of the dyke part may be overlapped with a frame of the refrigerator or the main door. The dyke part may restrict a cool air flow path generated between the two doors (main door-sub door), may divert cool air, and accordingly, dew formation generated when a gasket installed between the two doors is cooled may be prevented.

An end of the dyke part may protrude in the direction of the storage compartment of the refrigerator more than the gasket provided between the second door body and the frame or the second door body and the main door. Accordingly, the dyke part may cover the frame or an upper portion of a portion where the dyke part meets the main door to block a leakage flow path.

Furthermore, the dyke part may be provided to extend to a first plate of the second door body forming a side surface of the storage space. Then, the dyke part may block the entire leakage flow path between the sub door and the main door.

The vacuum insulation assembly may include a first casing facing the first door body and a second casing coupled to the first casing to form the vacuum chamber between the first casing and the second casing. A radiant heat shield film may be installed in the vacuum chamber of the vacuum insulation assembly, and a pair of spacers may be respectively provided at the opposite sides of the radiant heat shield film. The pair of spacers may be assembled with each other through a coupling hole of the radiant heat shield film to allow the radiant heat shield film to be spaced apart from both of the first casing and the second casing.

Furthermore, a coupling part may be formed in both of the first casing and the second casing so that the first casing and the second casing may be coupled to each other while being in close contact with each other along edges thereof. The coupling part may have a gap space between the coupling part and a peripheral part inside the heat insulating space. Therefore, the coupling part may be prevented from being brought into contact with the peripheral part inside the door, and removal of a vacuum state of the vacuum insulation assembly generated likely by interference between the parts may be prevented.

The second door body may include the first plate forming a side surface of the storage space, and a second plate connected to the first plate to form a rear surface of the storage space. At this point, (i) one end of the second door body extending from the first plate and located in the filling space filled with the foam filled part is spaced apart from the coupling part of the vacuum insulation assembly to have a first gap space between the coupling part and the end of the second door body, and (ii) a portion where the first plate and the second plate are connected to each other is spaced apart from the second casing of the vacuum insulation assembly to have a second gap space between the second casing and the portion. The two gap spaces may prevent the vacuum insulation assembly from interfering with other parts in the door.

Furthermore, the spacers may include a first spacer from which a boss part protrudes to pass through the coupling hole, and a second spacer having an assembly groove into which an end of the boss part that has passed through the coupling hole is coupled. At this point, the boss part may have a shape with the width widening gradually toward a surface of the first spacer. The shape of the boss part may prevent the radiant heat shield film from being brought into contact with the surface of the first spacer.

In addition, the radiant heat shield film may have a burring part bent along a rim of the coupling hole, and the burring part may extend in a longitudinal direction of the boss part to surround a surface of the boss part. The burring part may increase a contact area between the coupling hole and the boss part protruding on the spacer, and accordingly, may prevent the radiant heat shield film from being moved upward and downward between the pair of spacers.

Furthermore, the second spacer may have a flange part protruding in a direction of the first spacer, and the assembly groove may be formed inside the flange part. At this point, an outer diameter of the flange part may be formed larger than an inner diameter of the coupling hole, so that the flange part may prevent the radiant heat shield film from being brought into contact with a surface of the second spacer.

In addition, the radiant heat shield film may have a bead part protruding toward an inner surface of the first casing or an inner surface of the second casing. The bead part formed in the radiant heat shield film may reinforce the strength of the thin radiant heat shield film to further reduce noise generated when the radiant heat shield film is shaken.

Furthermore, an exhaust port may be connected to the vacuum insulation assembly to connect the vacuum chamber to the external space, and an end of the exhaust port may be received inside the second door body or may be surrounded by the foam filled part.

Advantageous Effects

As described above, according to the present disclosure, the refrigerator door having the vacuum insulation assembly and the method for manufacturing the same have the following effects.

In the present disclosure, the vacuum insulation assembly may be installed inside the refrigerator door. Since the vacuum insulation assembly has high heat insulation performance, there is the effect that the vacuum insulation assembly can be substituted for the existing foam filled part and, therefore, there is the effect that the thickness of the refrigerator door can be reduced. Furthermore, as described above, as the thickness of the refrigerator door is reduced, the volume of the storage compartment for storing food increases relatively, which is an advantage.

In addition, in the present disclosure, the vacuum insulation assembly may have the coupling part of which an edge portion is fixed by a welding method, etc. in order to maintain the vacuum chamber therein, and the coupling part may be installed not to interfere with other parts inside the refrigerator door. While the coupling part is surrounded with the foam filled part, a contact between a peripheral part inside the door and the coupling part can be prevented. Therefore, there is the effects that removal of the vacuum state of the vacuum insulation assembly likely generated by interference between the parts can be prevented, and eventually, the durability of the refrigerator door is improved.

Furthermore, when the refrigerator door of the present disclosure is applied to a door-in-door type double door, the dyke part may protrude on the sub door installed at the relatively outside portion in a direction in which the two doors are blocked from each other. The dyke part may restrict a cool air flow path formed between the two doors, or divert cool air. Accordingly, it is possible to prevent dew formation generated when the gasket installed between the two doors is cooled so that the quality of the refrigerator can be improved.

In addition, the radiant heat shield film may be embedded inside the vacuum insulation assembly installed inside the refrigerator door, and the radiant heat shield film may be installed to be spaced apart from each of the pair of spacers. This structure can prevent the radiant heat shield film from hitting the inner surface of the vacuum insulation assembly, and reduce noise.

Specifically, the coupling hole for an assembly with the spacer is formed in the radiant heat shield film constituting the vacuum insulation assembly, and the burring part is bent on a rim of the coupling hole. The burring part widens a contact area with the boss part protruding on the spacer. Therefore, the radiant heat shield film can restrict raised and lowered movements with respect to the pair of spacers, and therefore, noise generated in the door opening and closing process can be significantly reduced.

Furthermore, in the present disclosure, the bead part formed in the radiant heat shield film reinforces the strength of the thin radiant heat shield film to reduce noise generated when the radiant heat shield film is shaken.

In addition, in the present disclosure, in order to perform heat insulating of the internal space of the door, the vacuum insulation assembly is used and the foam filled part may be filled in a part of an edge without the vacuum insulation assembly. Therefore, since the amount of the foam filled part is significantly reduced, the manufacturing speed of the refrigerator door may increase, which is advantageous in mass production.

Furthermore, the foam filled part serves to surround an edge portion of the vacuum insulation assembly naturally to fix the edge, so that even when a separate fixing device is not provided, the vacuum insulation assembly can be securely fixed without interference with a peripheral part.

DESCRIPTION OF DRAWINGS

FIG. 1 is a perspective view showing a structure of a refrigerator door having a vacuum insulation assembly according to an embodiment of the present disclosure.

MODE FOR INVENTION

Figure 2:
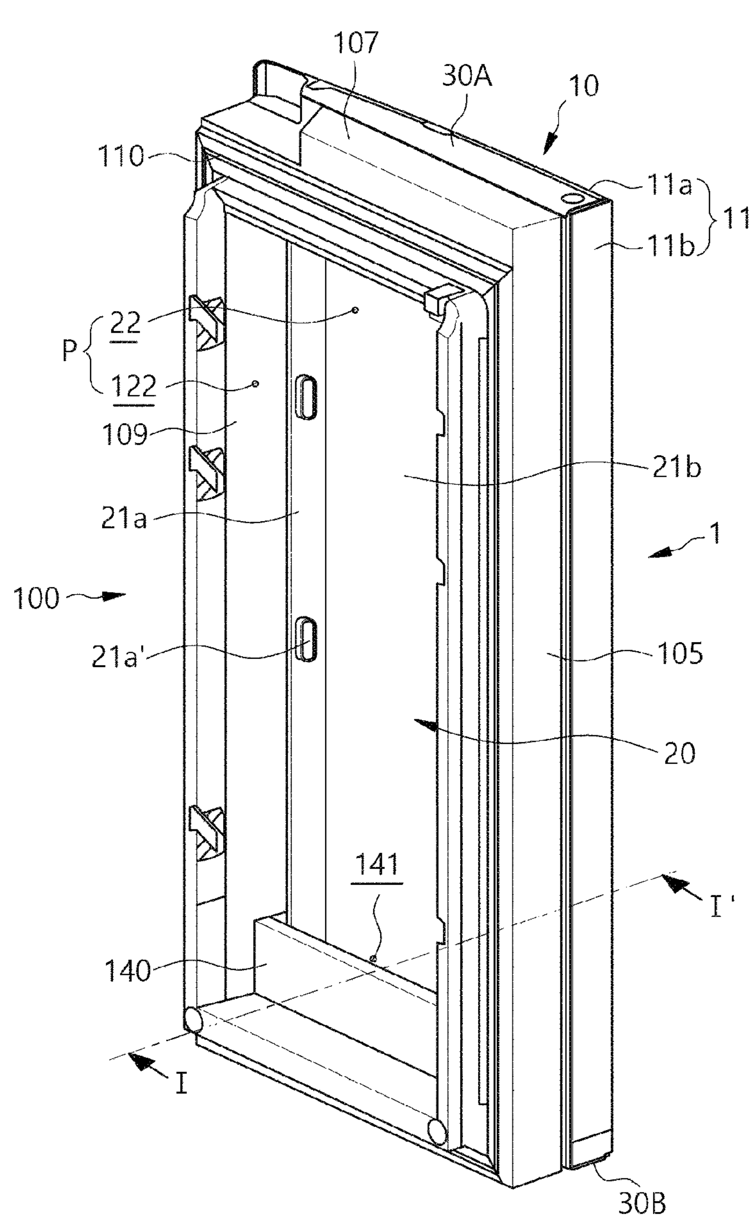
FIG. 2 is a perspective view showing the structure of the embodiment of the present disclosure at a different angle from FIG. 1.

Hereinbelow, exemplary embodiments of the present disclosure will be described in detail with reference to accompanying drawings. As for reference numerals associated with parts in the drawings, wherever possible, the same reference numerals will be used throughout the drawings and the description to refer to the same or like elements or parts. Furthermore, in describing the embodiment of the present disclosure, when detailed description of the known functions and configuration related with the present disclosure may make the gist of the present disclosure unclear, a detailed description thereof will be omitted.

The present disclosure relates to a refrigerator door having a vacuum insulation assembly 50 (hereinbelow, which is referred to as "refrigerator door"), and the vacuum insulation assembly 50 is embedded in the refrigerator door so that insulation performance can be enhanced and the entire thickness of the refrigerator door can be reduced. The present disclosure may be applied to a general refrigerator door consisting of a single door, or may be applied to a double door of a door in door type. Hereinbelow, an application in which the present disclosure is applied to the double door will be described as example.

Figure 1:
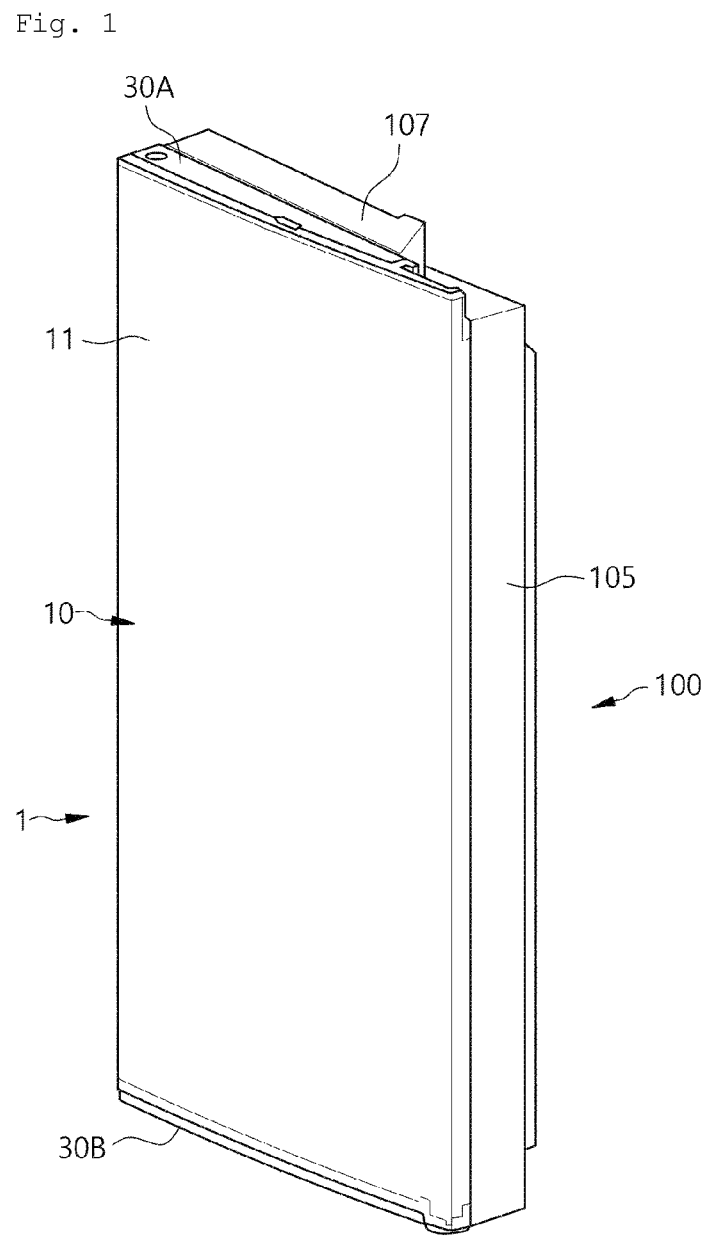

As shown in FIGS. 1 and 2, views showing the refrigerator door having a double structure. At this point, a main door 100 is installed at a cabinet (not shown) of a refrigerator, and a sub door 1 may be installed outside the main door 100. At this point, the main door 100 and the sub door 1 are names given for convenience, and may be called as a first door and a second door or an inner door or an outer door.

The main door 100 and the sub door 1 may be respectively installed to the cabinet, and may be rotated independently from each other. For example, when only the sub door 1 is rotated without rotating the main door 100, a storage space P provided between the sub door 1 and the main door 100 may be exposed. The storage space P may be partitioned with a basket 27 attached to an inner surface of the sub door 1, etc. At this point, the inner surface of the sub door 1 means a surface facing the inside space of the cabinet, among surfaces of a second door body 20, which will be described below.

In the embodiment, when the sub door 1 is opened, the storage compartment provided in the inside space of the cabinet is connected to the external space through the main door 100, but even when the sub door 1 is opened, the storage compartment may be blocked with the main door 100.

For convenience of description, in describing the main door 100 first, the main door 100 is rotatably installed at the cabinet and may serve to open and close the storage compartment selectively. The frame of the main door 100 is made of a main frame 105 having a roughly rectangular frame shape. The main frame 105 may consist of one part or multiple parts. In the embodiment, an upper frame 107 is installed on an upper portion of the main frame 105, and the upper frame 107 is formed shorter than the upper portion of the main frame 105 to provide a space in which a hinge assembly (not shown) can be installed. The main frame 105 and the upper frame 107 may be formed in an integrated body.

A main storage space 122 is provided inside the main door 100. The main storage space 122 is an empty space formed at the center portion surrounded by the main frame 105. The main storage space 122 is connected to a main storage space 122 of the sub door 1, which will be described below, to form one storage space P.

A main gasket 110 may be installed on a surface of the main frame 105. The main gasket 110 is provided to seal a gap between the main door 100 and the cabinet, and may be installed to surround the main frame 105. The main gasket 110 may provide magnetism between the main door 100 and the cabinet to maintain a tight contact state between the main door 100 and the cabinet.

Figure 7:
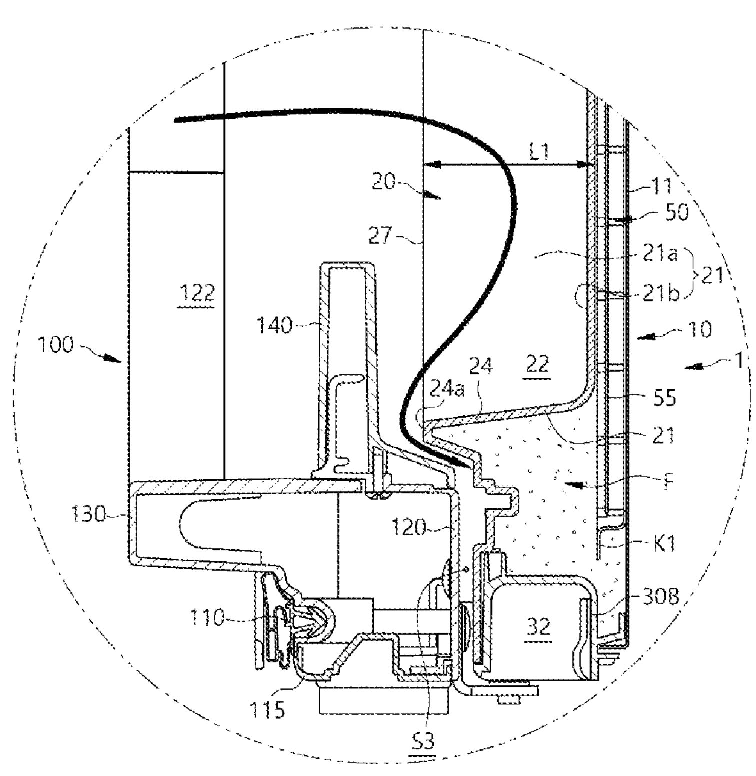
FIG. 7 is a sectional view taken along line I-I' in FIG. 2.

Referring to FIG. 7 that is a sectional view taken along line I-I' in FIG. 2, a lower portion of the main door 100 includes a main cover part 115 constituting a lower portion of the main gasket 110, and the main cover part 115 may be connected to a lower frame 120 facing the sub door 1. The main cover part 115 and the lower frame 120 may be formed in an integrated body.

The lower frame 120 includes a bottom portion 130 protruding in a direction of the storage compartment of the refrigerator, and the main storage space 122 may be provided above the bottom portion 130. As shown in FIGS. 2 and 7, the bottom portion 130 includes a partition wall 140. The partition wall 140 has a structure protruding upward from the bottom portion 130, and partitions the storage space P. The partition wall 140 may be omitted, and other parts may be further coupled thereto.

Next, looking at the sub door 1, as shown in FIGS. 1 and 2, the sub door 1 is brought into close contact with the main door 100, thereby forming a roughly hexahedral door. The sub door 1 may be rotated independently from the main door 100, and the main door 100 and the sub door 1 may be rotated together. When the main door 100 and the sub door 1 are rotated together to be opened, the storage compartment of the refrigerator is exposed to the outside space.

The sub door 1 forms an exterior surface of the refrigerator, and in other words, the sub door 1 may be a portion exposed outward of the refrigerator. Since the sub door 1 constitutes an outermost portion of a front surface of the refrigerator, the sub door 1 needs a heat insulating function. To this end, the vacuum insulation assembly 50 is inserted inside the sub door 1.

Figure 3:
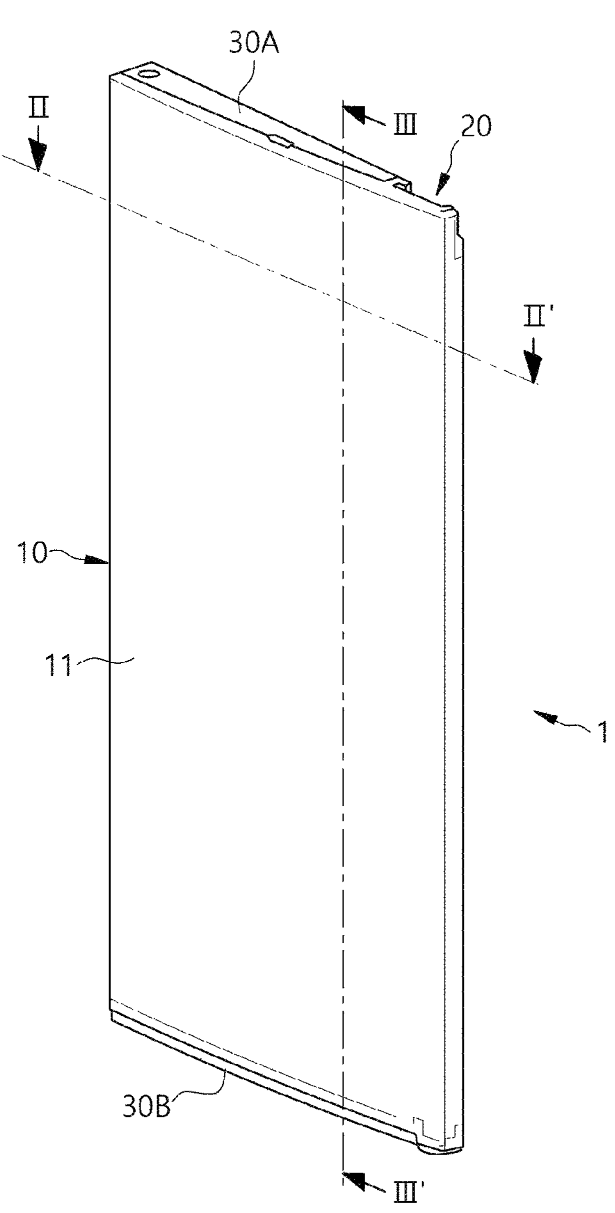
FIG. 3 is a perspective view showing a structure of a sub door constituting the embodiment of the present disclosure.
Figure 4:
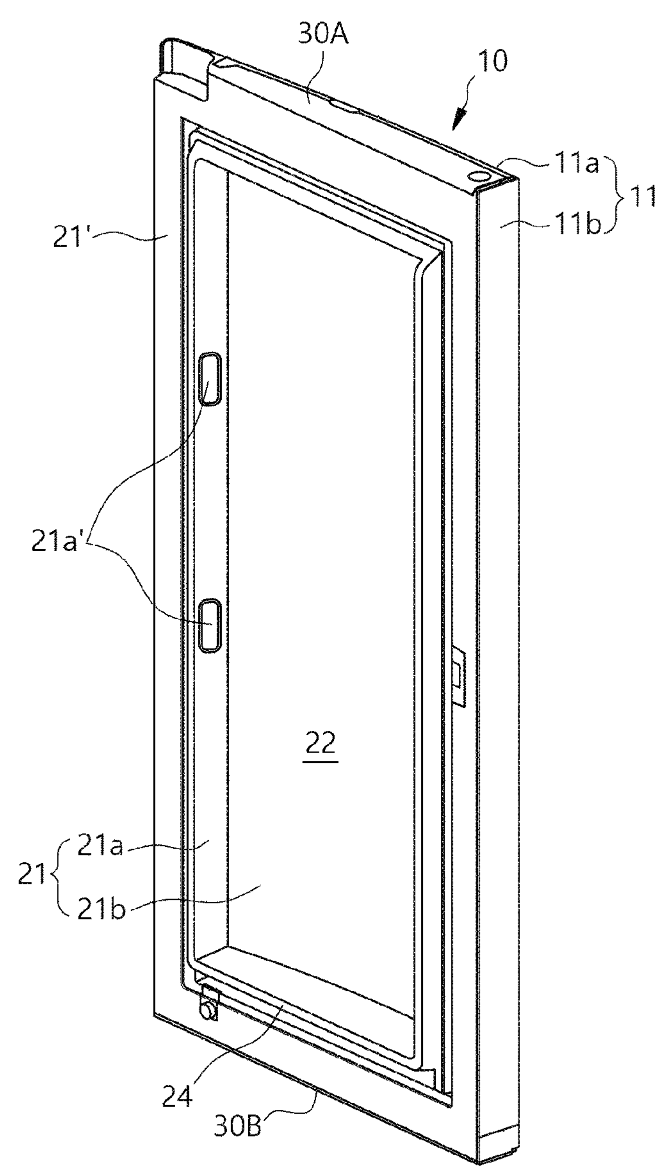
FIG. 4 is a perspective view showing the structure of the sub door constituting the embodiment of the present disclosure, at a different angle from FIG. 3.

FIGS. 3 and 4 are views showing only the structure of the sub door 1 without the main door 100. Looking at the structure of the sub door 1, mainly, a first door body 10, the second door body 20, an upper cover 30A, and a lower cover 30B may be coupled to each other to form one frame constituting the sub door 1. The first door body constitutes relatively the outer portion and the second door body 20 is coupled to the first door body 10 to face the storage compartment. In other words, it may be understood that the second door body 20 constitutes the inner surface of the sub door 1. At this point, the inner surface means a surface that faces the storage compartment of the refrigerator.

The first door body 10 has a roughly flat plate structure. In the embodiment, the frame of the first door body 10 may be formed of a door plate 11. The door plate 11 includes a front plate 11*a* forming a front surface of the refrigerator, and a side plate 11*b* bent from the front plate 11*a*. The front plate 11*a* and the side plate 11*b* are connected to each other to form a rough-'ㄱ' shape. In the embodiment, the front plate 11*a* and the side plate 11*b* are formed in an integrated body.

Figure 6:
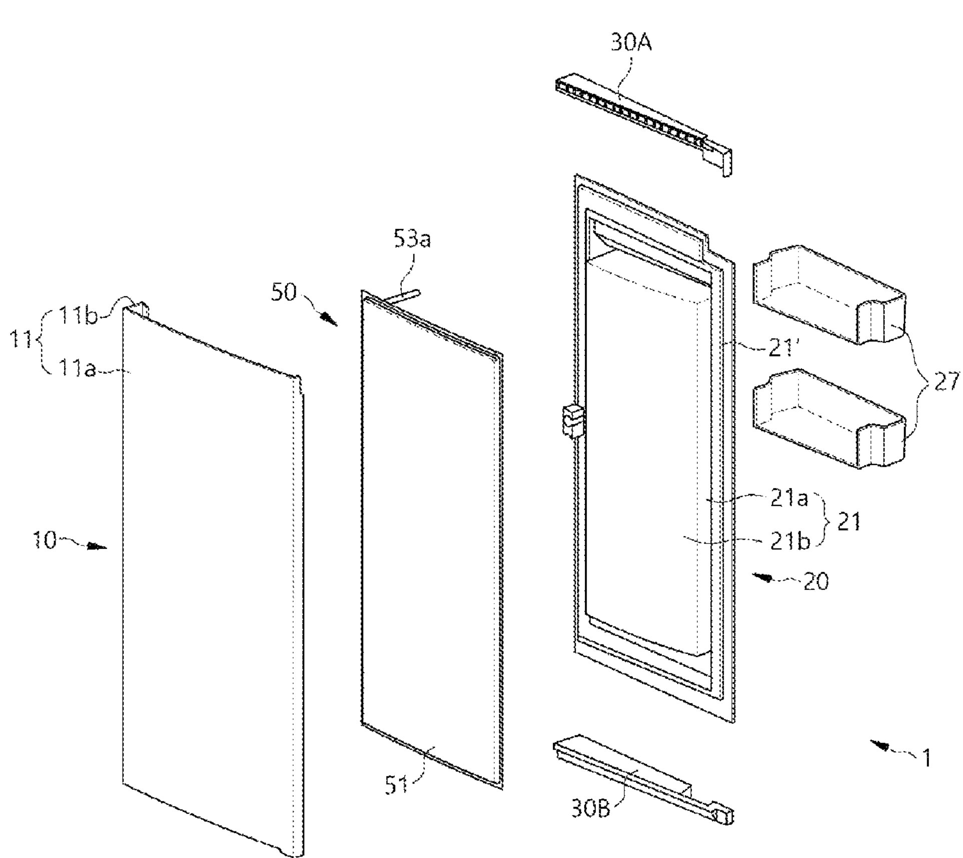
FIG. 6 is an exploded-perspective view showing parts constituting the sub door shown in FIG. 3.

Looking at FIG. 6 that is an exploded-perspective view, the second door body 20 may be coupled to the first door body 10 with the vacuum insulation assembly 50 located therebetween. The second door body 20 may be coupled to the first door body 10 to form the heat insulating space between the first door body 10 and the second door body 20. The heat insulating space is filled with the vacuum insulation assembly 50 and a foam filled part F, which will be described below, and the foam filled part F fills the heat insulating space except for a portion occupied by the vacuum insulation assembly 50.

The second door body 20 may include a sub frame 21' constituting an outer part thereof, and an inner frame 21 surrounded by the sub frame 21'. The sub frame 21' has a roughly rectangular frame shape, and the inner frame 21 is coupled to an inner portion of the sub frame 21' to form the inner surface of the sub door 1.

Looking at the structure of the inner frame 21, as shown in FIG. 4, the inner frame 21 is recessed in a direction of the first door body 10, i.e., an outward direction of the refrigerator to form the main storage space 122 therein. Specifically, the inner frame 21 includes a first plate 21*a* forming a side surface of the main storage space 122, and a second plate 21*b* forming a rear surface of the main storage space 122. At this point, the rear surface of the main storage space 122 means the inner surface of the sub door 1 facing the storage compartment of the refrigerator. In other words, the first plate 21*a* may be a side surface of the inner frame 21, and the second plate 21*b* may be a rear surface of the rear surface of the inner frame 21 and a bottom surface of the main storage space 122.

The first plate 21*a* and the second plate 21*b* may be formed in an integrated body. The first plate 21*a* has a roughly rectangular frame shape that surrounds edges of the inner frame 21, and the second plate 21*b* has a flat plate structure. In other words, the first plate 21*a* may be understood to protrude along edges of the second plate 21*b*.

The first plate 21*a* may include a hanging part 21*a*'. The hanging part 21*a*' has a structure that protrudes from the first plate 21*a*, and the basket 27 (referring to FIG. 6) may be fitted thereto. The hanging part 21*a*' may include a plurality of hanging parts 21*a*' having different heights in the first plate 21*a*, and in this case, a plurality of baskets 27 may be installed in the main storage space 122. The hanging part 21*a*' may have a structure that is recessed inward of the first plate 21*a*, not the protruding structure.

The width of main storage space 122 may be defined from a surface of the second plate constituting the second door body 20 to an end of a dyke part 24. In FIG. 7, a size of the width of the main storage space 122 is marked with L1. In the embodiment, the vacuum insulation assembly 50 reduces the thickness of the heat insulating structure and the dyke part 24 extends at the same time, so that the width of the main storage space 122 may widen significantly. For example, reference numeral 27 shows an end of the first plate 21*a* facing the main door 100.

As shown in FIGS. 4 and 7, the second door body includes the dyke part 24. The dyke part 24 may be understood as a structure extending from the first plate 21*a* constituting the second door body 20, and the dyke part 24 protrudes in the direction of the storage compartment. The dyke part 24 may be provided throughout the entire area of the first plate 21*a*, and may be provided in some areas.

The dyke part 24 may be also provided in a lower portion of the second door body 20. As shown in FIG. 7, the dyke part 24 protrudes from the lower portion of the second door body 20 toward the main door 100. In other words, the dyke part 24 protrudes in the direction of the storage compartment. In the embodiment, the dyke part 24 protrudes relatively more than the lower cover 30B constituting a lower structure of the sub door 1 in the direction of the storage compartment (left direction based on FIG. 7).

At least a part of the dyke part 24 may be overlapped with the main door 100. The dyke part 24 extends to a position where the dyke part 24 is overlapped with an upper surface of the main cover part 115 constituting the main door 100, and eventually, an end 24*a* of the dyke part 24 is stacked above the main cover part 115. When the refrigerator door of the present disclosure has the structure of a single door without dividing into the main door 100 and the sub door 1, the end 24a of the dyke part 24 may be overlapped with a frame constituting the cabinet of the refrigerator without being overlapped with the upper surface of the main cover part 115.

Although not shown in the drawings, a sub gasket may be installed between the main door 100 and the sub door 1, and the end of the dyke part 24 may protrude more than the sub gasket provided between the sub door 1 and the main door 100 in the direction of the storage compartment of the refrigerator. For reference, FIG. 7 shows an inner space S3, and the sub gasket may be installed in the inner space S3.

As described above, since the embodiment has the structure in which the dyke part 24 is overlapped with the main door 100, in order to allow cooling air transmitted from the storage compartment of the refrigerator to flow into the inner space S3 located between the main door 100 and the sub door 1, an indirect route such as arrow shown in FIG. 7 is inevitably required. In other words, the cool air of the refrigerator does not flow directly into the inner space S3. Therefore, the cool air does not escape easily into the inner space S3, and the cool air lowers the temperature of the sub gasket to prevent dew formation occurring on the sub gasket. At this point, eventually, the inner space S3 serves as a leakage flow path of the cool air, and the dyke part 24 blocks the leakage flow path.

Specifically, the cool air of the refrigerator tends to be sunk downward and, in the embodiment, the dyke part 24 blocks an entrance of the leakage flow path (inner space S3) through which the cool air leaks, thereby interrupting a flow of the cool air.

As shown in FIG. 7, a surface of the end of the dyke part 24 and a surface of the main cover part 115 located at a position where the main cover part 115 and the dyke part 24 are overlapped with each other may be formed in inclined surfaces corresponding to each other. The inclined surfaces allow the end of the dyke part 24 and the main cover part 115 to be naturally guided with each other when the sub door 1 is closed while being rotated toward the main door 100. Furthermore, the inclined surfaces lengthens a section where the dyke part 24 is overlapped with the main door 100, thereby preventing leakage of the cool air efficiently.

Figure 5:
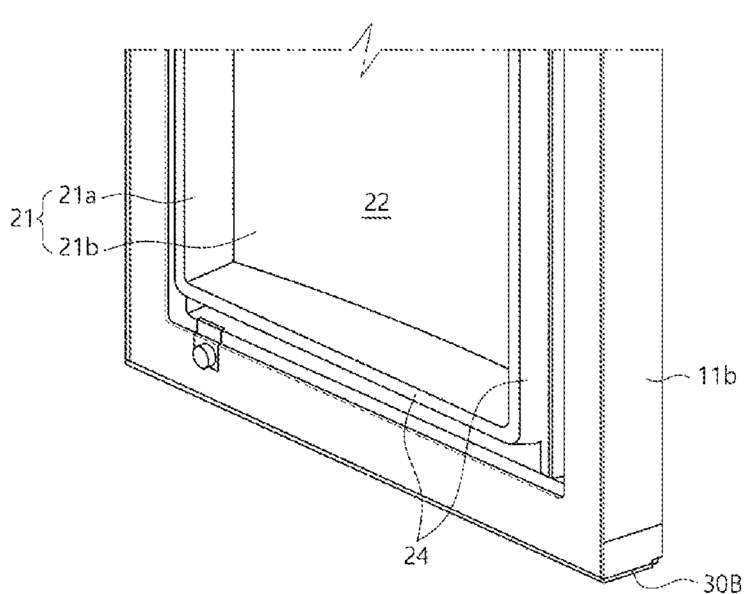
FIG. 5 is an enlarged-perspective view showing a lower structure of the sub door shown in FIG. 4.

In the embodiment, the dyke part 24 is not only located at the lower portion of the second door body 20, but may be provided throughout the entire area of the first plate 21a. Therefore, the dyke part 24 may be overlapped with the entire inner surface of the main door 100 along edges of the main frame 105 of the main door 100. As shown in FIG. 5, the view shows the dyke part 24 provided not only at the lower portion of the first plate 21a, but also side surfaces thereof.

Figure 8:
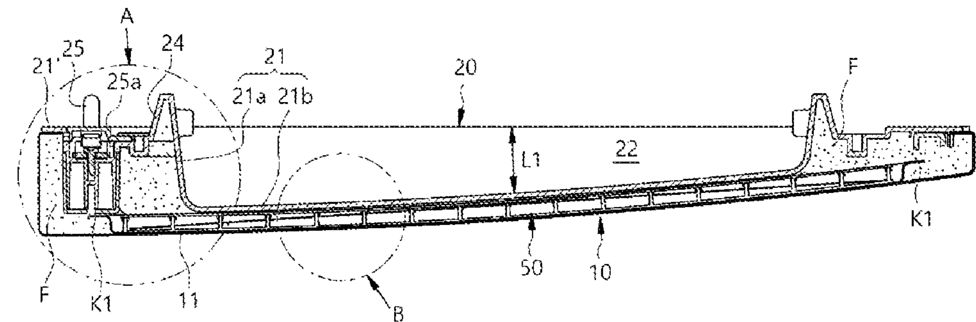
FIG. 8 is a sectional view taken along line II-II' in FIG. 3.
Figure 9:
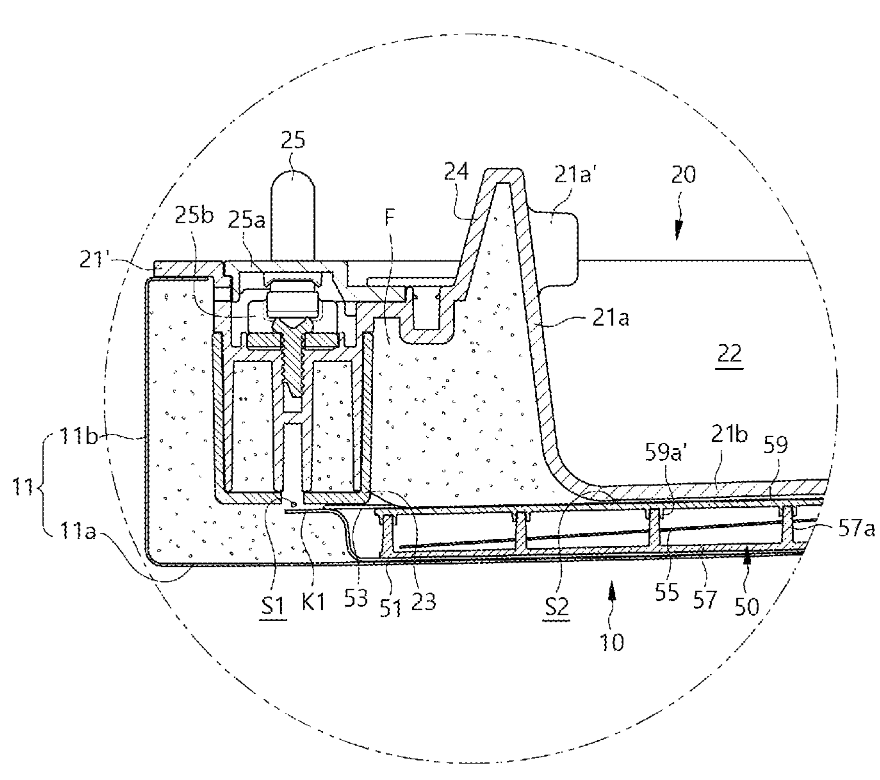
FIG. 9 is an enlarged view showing part A in FIG. 8.

As shown in FIG. 8 that is a sectional view taken along like II-II' in FIG. 3, and FIG. 9 that is an enlarged view showing part A in FIG. 8, the sub door 1 may include a latch means 23, 25. The latch means 23, 25 serves to maintain a state in which the sub door 1 is in close contact with the main door 100, and the latch means 23, 25 may prevent the sub door 1 from being arbitrarily opened by an external force. The latch means 23, 25 may be configured to be caught or unlocked to the main door 100 while a latch body 25 is rotated or linearly moved.

A latch housing 23 may be embedded inside the heat insulating space formed between the first door body 10 and the second door body 20, and the latch body 25 may be installed in the latch housing 23. The latch housing 23 may be formed in an integrated body with the second door body 20, but may be formed in a separate body from the second door body 20.

The latch means 23, 25 may include a latch cover covering a peripheral part of the latch body 25 and a mounting part 25b allowing the latch body 25 to be in a mounting state, inside the latch cover 25a. Although not shown in the drawings, an elastic member is provided in the mounting part 25b to provide an elastic force to allow the latch means 23, 25 to be in a caught state. In addition, a button assembly (not shown) is connected to the latch body to allow the latch means 23, 25 to be turned into an unlocked state when a user operates the latch body 25 while restoring the elastic force of the elastic member.

At this point, all the peripheral part of the latch means 23, 25 in addition to the latch housing 23 may be filled with the foam filled part F. As shown in FIG. 9, a remaining portion of the heat insulating space except for the vacuum insulation assembly 50 is filled with the foam filled part F. In the embodiment, the most portion of the heat insulating space is occupied by the vacuum insulation assembly 50, and the space occupied by the vacuum insulation assembly 50 has a very narrow width. In addition, the foam filled part F is filled only in edge portions of the sub door 1 corresponding to opposite ends of the vacuum insulation assembly 50.

As described above, the portion filled with the foam filled part F is limited to an edge of the heat insulating space, so that amount of injection and foaming time of a filler may be reduced. Therefore, the amount of the foam filled part F is sharply reduced, so that the manufacturing speed of the refrigerator door can be increased.

Meanwhile, the foam filled part F serves to surround an edge portion of the vacuum insulation assembly 50 naturally to fix the edge, so that even when a separate fixing device is not provided the vacuum insulation assembly 50 can be securely fixed without interference with the peripheral part. The above described structure will be described again in a process of describing the vacuum insulation assembly 50 below.

The vacuum insulation assembly 50 may be inserted into the heat insulating space. The vacuum insulation assembly 50 serves as the heat insulating function of the sub door 1, and an inside portion thereof is formed in the vacuum chamber. The vacuum chamber may increase the heat insulation function of the sub door 1 significantly, but only the vacuum chamber is insufficient to prevent transmission of an internal radiant heat, so that the vacuum insulation assembly 50 includes a radiant heat shield film in the embodiment.

Figure 10:
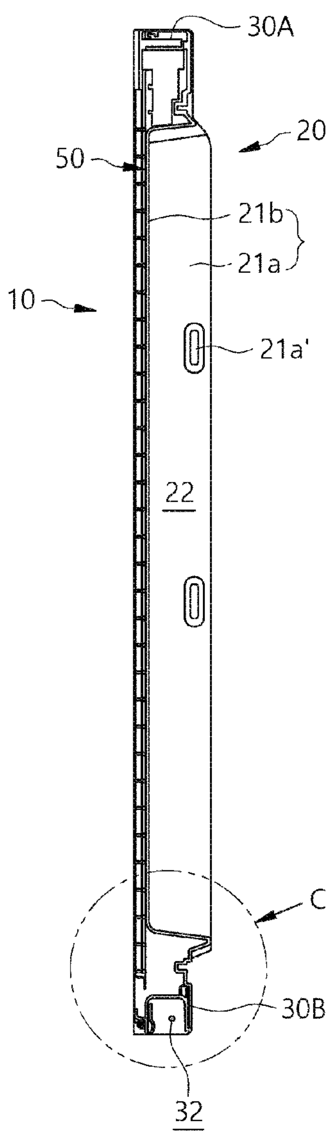
FIG. 10 is a sectional view taken along line III-III' in FIG. 3.

The vacuum insulation assembly 50 may have a roughly rectangular plate structure. As shown in FIGS. 8 and 10, the vacuum insulation assembly 50 may have a transverse width and a vertical height similar to an entire transverse length (referring to FIG. 8) of the sub door 1 and an entire vertical height (referring to FIG. 10) of the sub door 1. However, the edge of the vacuum insulation assembly 50 is spaced apart from an inner surface of the heat insulating space of the sub door 1 by a predetermined distance. At this point, the edge of the vacuum insulation assembly 50 means an end portion formed while wrapping corners of the vacuum insulation assembly 50.

Figure 11:
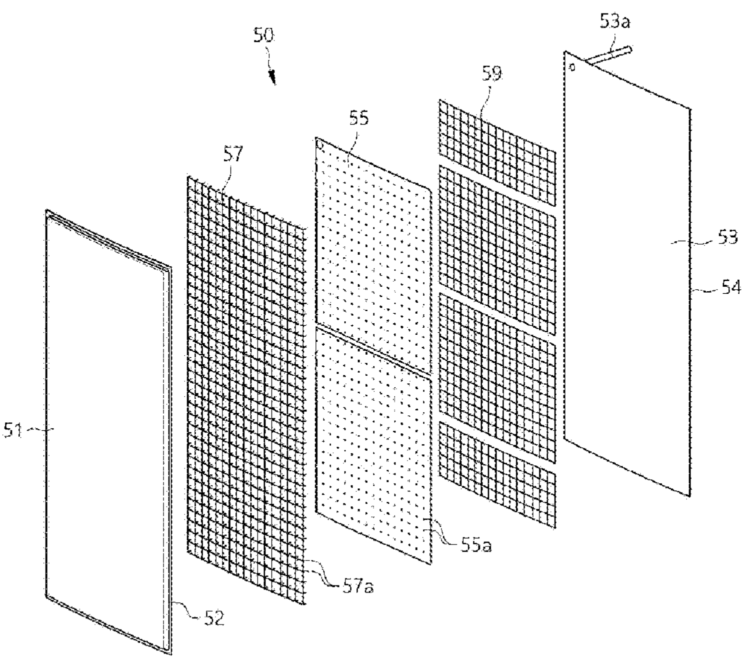
FIG. 11 is an enlarged-perspective view showing parts constituting the vacuum insulation assembly shown in FIG. 5.

FIG. 11 is an exploded-perspective view showing parts constituting the vacuum insulation assembly 50. As shown in the drawing, the vacuum insulation assembly 50 includes a first casing 51 and a second casing 53 that form outer portions, and a radiant heat prevention part 55, 57, 59 embedded between the first casing 51 and the second casing 53. Each of the first casing 51 and the second casing 53 may have a rectangular plate structure.

In the embodiment, the first casing 51 and the second casing 53 may be made of a metal material. Then, in a process in which the inside space of the vacuum insulation assembly 50 is changed into the vacuum chamber through an exhaust port 53*a*, strong pressure and high temperature may be applied to the first casing 51 and the second casing 53. In order to endure the conditions, it is preferable that the first casing 51 and the second casing 53 are made of a metal material having high strength. At this point, the first casing 51 and the second casing 53 may be made of various materials such as steel sheet, stainless steel, alloy plate, etc.

At this point, a bent part 52 may be provided on an edge of the first casing 51. The bent part 52 is a part bent to protrude in a direction of a surface of the second casing 53, and a surface of the first casing 51 has roughly a recessed shape by the bent part 52, the surface facing an inner surface of the first casing 51, i.e., the second casing 53. The inside space of the first casing 51 having the recessed shape becomes the vacuum chamber, and at the same time serves, becomes a space into which the radiant heat prevention part 55, 57, 59 is inserted. The bent part 52 may be joined to an edge part 54 of the second casing 53.

The exhaust port 53*a* may be formed in the second casing 53. The exhaust port 53*a* protrudes on the second casing 53, and has a kind of hollow tube structure. Air inside the vacuum chamber may be discharged to the external space through the exhaust port 53*a*, and then the degree of vacuum inside the vacuum chamber can be increased. The exhaust port 53*a* may be cut out with remaining a part thereof after an exhaust process is finished, and in a cutting process, an end of the exhaust port 53*a* is compressed to allow the vacuum chamber to be maintained in a vacuum state.

The exhaust port 53*a* may be fixed to the second door body 20 in a manufacturing process of the sub door 1, or may be fixed while being embedded the inside portion of the foam filled part F, inside the heat insulating space.

At this point, the first casing 51 may be fixed to an inner surface of the first door body 10, and a coupling part K1 provided on the edge of the first casing 51 may be spaced apart from the inner surface of the first door body 10. As shown in FIG. 8, the coupling part K1 formed on each of the opposite ends of the first casing 51 is spaced apart from the inner surface of the first door body 10, more precisely, from the front plate 11*a*.

The first casing 51 may be temporarily fixed to an inner surface of the front plate 11*a* with an adhesive, an adhesive tape, or the like. When the foam filled part F is filled in the filling space provided in the sub door 1, the entire vacuum insulation assembly 50 including the first casing 51 may be turned in a completely fixed state with respect to an inside portion of the sub door 1.

Looking at a structure of the radiant heat prevention part 55, 57, 59, the radiant heat shield film 55 may be provided at a middle portion, and spacers 57 and 59 may be provided at opposite sides of the radiant heat shield film 55, respectively. The spacers 57 and 59 include a first spacer 57 and a second spacer 59. The first spacer 57 is close to the first casing 51, and the second spacer 59 is close to the second casing 53. The spacers 57 and 59 prevent the radiant heat shield film 55 from being brought into contact with the surface of the first casing 51 or the surface of the second casing 53.

The radiant heat shield film 55 may be made of an aluminum material, be made by attaching an aluminum metallized film on an injection-molded object, or be made by metal-coating on a surface of a thin plate of various materials.

As shown in FIG. 11, a plurality of radiant heat shield films 55 may be provided inside the vacuum insulation assembly 50. The radiant heat shield film 55 may be divided into a plurality of radiant heat shields for convenience in manufacture and assembly, but may be formed in a single part. Otherwise, the radiant heat shield film 55 may be formed by staking a plurality of radiant heat shield films. In other words, the radiant heat shield films 55 may be stacked to each other with gaps from each other between the pair of spacers 57 and 59.

A coupling hole 55*a* may be formed in the radiant heat shield film 55. The coupling hole 55*a* is formed by penetrating through the radiant heat shield film 55, and a plurality of coupling holes 55*a* may be formed in the radiant heat shield film 55. The pair of spacers 57 and 59 constituting the radiant heat prevention part 55, 57, 59 may be assembled to each other through the coupling hole 55*a*.

Figure 12:
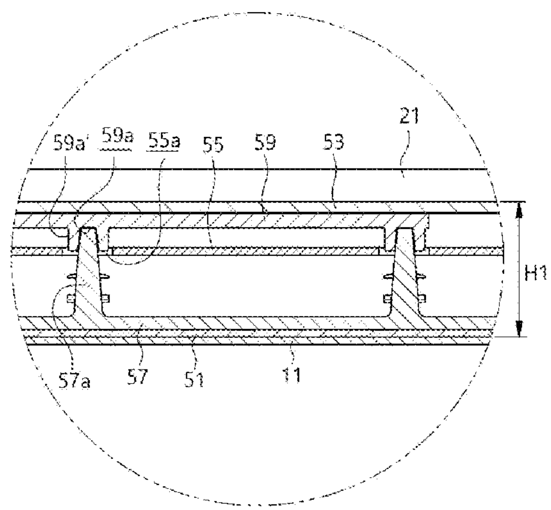
FIG. 12 is an enlarged view showing part B in FIG. 8.

As shown in FIG. 12, a boss part 57*a* may protrude on the first spacer 57 in a cylindrical shape, and an assembly groove 59*a* coupled to the boss part 57*a* may be formed on the second spacer 59 located opposite to the first spacer 57 with the radiant heat shield film 55 located therebetween. An end of the boss part 57*a* may be coupled to the assembly groove 59*a*. At this point, the boss part 57*a* passes through the coupling hole to be fitted in the assembly groove 59*a*, so that the radiant heat shield film 55 eventually is installed between the first spacer 57 and the second spacer 59.

As shown in FIG. 12, the entire height H1 of the vacuum insulation assembly 50 may be a distance between the first casing 51 and the second casing 53. It is only necessary to provide the vacuum chamber, the entire height H1 of the vacuum insulation assembly 50 may be formed relatively short. Specifically, the radiant heat shield film 55 has a thin plate shape, so that the entire height H1 of the vacuum insulation assembly 50 may be lowered.

Figure 13:
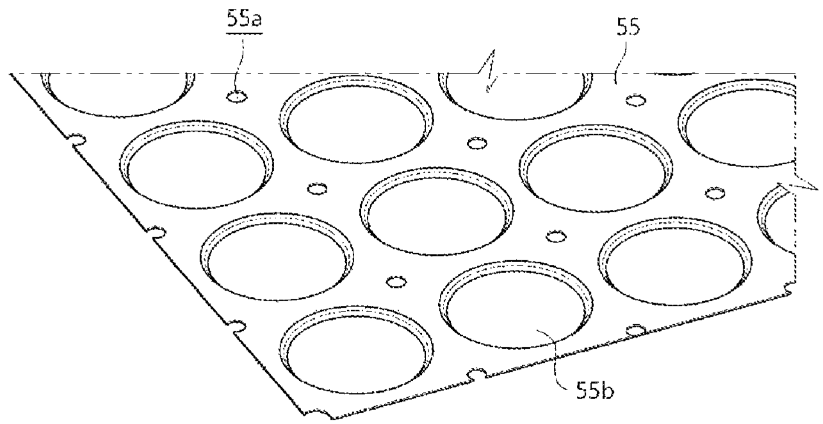
FIG. 13 is an enlarged-perspective view showing a radiant heat shield film of the vacuum insulation assembly constituting the embodiment of the present disclosure.
Figure 14:
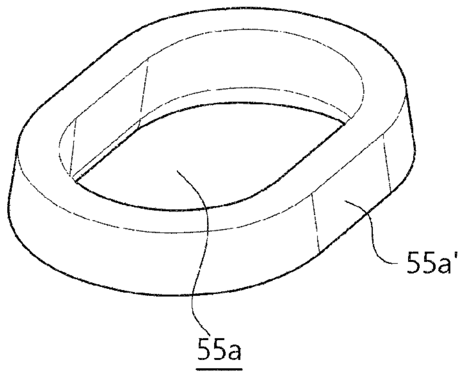
FIG. 14 is an enlarged-perspective view showing a coupling hole of the radiant heat shield film shown in FIG. 13.

As shown in FIGS. 13 and 14, the radiant heat shield film 55 has a thin plate shape, and the plurality of coupling holes 55*a* may be formed at constant gaps. In the embodiment, each of the coupling holes 55*a* is a circular hole, but the shape of the coupling hole 55*a* may be formed in various shapes. For example, the circular coupling holes are shown in FIG. 13, but a roughly oval coupling hole is shown in FIG. 14.

A burring part 55*a*' may be provided on a rim of the coupling hole 55*a*. At this point, the rim of the coupling hole 55*a* means a portion formed by surrounding an inner surface of the coupling hole 55*a*, and the burring part 55*a*' may be formed by surrounding the rim of the coupling hole 55*a*. The burring part 55*a*' is formed in a bent shape to increase the thickness, i.e., the entire height of the coupling hole 55*a*.

Figure 15:
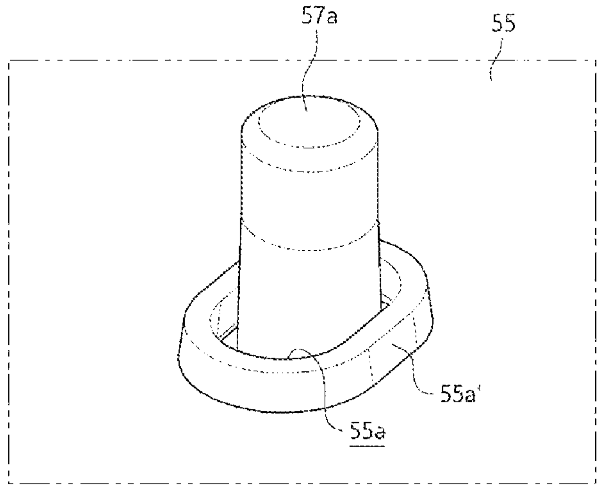
FIG. 15 is a perspective view showing an assembled state between the radiant heat shield film and a first spacer of the vacuum insulation assembly constituting the embodiment of the present disclosure.

The burring part 55*a*' extends in a longitudinal direction of the boss part 57*a* of the first spacer 57 to wrap a surface of the boss part 57*a*. FIG. 15 is a view showing the surface of the boss part 57*a* that has passed through the coupling hole 55*a*, the surface of the boss part 57*a* being wrapped by the boss part 57*a*. Of course, as shown in FIG. 15, the coupling hole 55*a* has an oval shape, or may have a circular shape like a cross sectional area of the boss part 57*a*.

In the embodiment, the boss part 57*a* has a shape of which a width narrows gradually in an upward direction, and in other words, the boss part 57*a* may be formed such that the width thereof increases gradually toward a surface of the first spacer 57. At this point, a width of a protruding end of the boss part 57*a* is smaller than an inner diameter of the coupling hole 55*a*, but a width of a lower end of the boss part 57*a* connected to the first spacer 57 is larger than the inner diameter of the coupling hole 55*a*. Therefore, when the boss part 57*a* is fitted in the coupling hole 55*a*, as shown in FIG. 15, there may be a gap between the inner surface of the coupling hole 55*a* and an outer surface of the boss part 57*a*, but when the boss part 57*a* is fitted more deeply into the coupling hole 55*a*, the outer surface of the boss part 57*a* is brought into contact with the inner surface of the coupling hole 55*a*.

Figure 16:
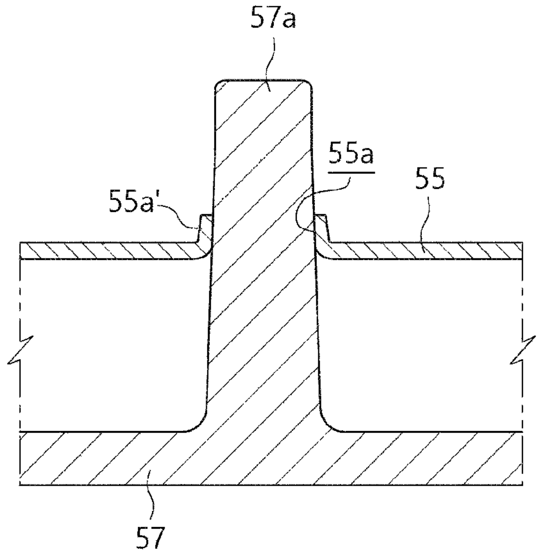
FIG. 16 is a side sectional view showing a structure of FIG. 15.

Therefore, a contact area between the boss part 57*a* protruding on the first spacer 57 and the coupling hole may widen by the burring part 55*a*'. FIG. 16 is a view showing the burring part 55*a*' of which the inner surface is in surface-contact with the outer surface of the boss part 57*a*. Then, the raised and lowered movements of the radiant heat shield film 55 between the pair of spacers 57 and 59 may be restricted. When the movements of the radiant heat shield film 55 is restricted, in a process in which the sub door 1 is opened and closed, noise generated when the radiant heat shield film 55 hits the pair of spacers 57 and 59, or noise generated when the radiant heat shield film 55 is bent itself can be prevented.

Looking at FIG. 13 again, the radiant heat shield film 55 may include a bead part 55*b*. The bead part 55*b* protrudes from the radiant heat shield film 55 toward an inner surface of the first casing 51 or an inner surface of the second casing 53, and may be formed in a punching process. The bead part 55*b* is a structure that reinforces the strength of the radiant heat shield film 55 having a thin plate shape. The bead part 55*b* reinforces the strength of the thin radiant heat shield film 55 to more reduce noise generated when the radiant heat shield film 55 is shaken.

The bead part 55*b* may be formed between the coupling holes 55*a*. In the embodiment, the bead part 55*b* and the coupling hole 55*a* are alternately disposed on the radiant heat shield film 55. A plurality of bead parts 55*b* may be provided in the radiant heat shield film 55. In the embodiment, each of the bead parts 55*b* is formed larger than the coupling hole 55*a*, and the bead part 55*b* has a circular-depressed structure.

Of course, the bead part 55*b* may be only formed to have the depth that is sufficient to prevent the head part 55*b* not to be in contact with the inner surface of the first casing 51 or the inner surface of the second casing 53. In addition, the bead part 55*b* may not be formed in a circular shape but may be formed in various shapes, and the size thereof may be various.

Looking at the pair of spacers 57 and 59, as described above, the pair of the spacers 57 and 59 includes the first spacer 57 and the second spacer 59, and the spacers may be made of a material that is relatively light and with low heat conductivity such as a resin injection molded object. The first spacer 57 and the second spacer 59 may be disposed at opposite sides of the radiant heat shield film 55.

As shown in FIG. 12, the boss part 57*a* of the first spacer 57 passes through the coupling hole 55*a*, and the end of the boss part 57*a* may be assembled to the second spacer 59. More precisely, the assembly groove 59*a* is formed in the second spacer 59 and the end of the boss part 57*a* may be fixed by the assembly groove 59*a*. When the boss part 57*a* is fixed inside the assembly groove 59*a*, the first spacer 57 and the second spacer 59 are assembled to each other with the radiant heat shield film 55 located therebetween.

At this point, a flange part 59*a*' may protrude on the second spacer 59 in a direction of the first spacer 57, and the assembly groove 59*a* may be formed inside the flange part 59*a*'. In addition, when an outer diameter of the flange part 59*a*' is larger than the inner diameter of the coupling hole 55*a*, the flange part 59*a*' is not inserted into the coupling hole 55*a*, and may support a peripheral part of the rim of the coupling hole 55*a*.

In other words, (i) due to the diameter of the boss part 57*a* larger than the inner diameter of the coupling hole 55*a*, a distance of the radiant heat shield film 55 moved in a direction of the first spacer 57 may be limited, and (ii) in the opposite direction, since the flange part 59*a*' protruding on the second spacer 59 supports the peripheral part of the coupling hole 55*a*, a distance of the radiant heat shield film 55 moved in a direction toward the second spacer 59 may be limited.

Meanwhile, the first casing 51 and the second casing 53 are joined with each other to seal the vacuum chamber. The first casing 51 and the second casing 53 are joined while the bent part 52 of the first casing 51 is in close contact with the surface of the second casing 53. For example, the first casing 51 may be joined with the second casing 53 by a welding method. The first casing 51 and the second casing 53 may be joined with each other by an ultrasonic welding method.

The first casing 51 and the second casing 53 may have the coupling part K1 where the first casing 51 and the second casing 53 are joined with each other, and the coupling part K1 may be continuously formed along the edge of the vacuum insulation assembly 50. When the coupling part K1 is formed along the edge of the vacuum insulation assembly 50, the inner volume of the vacuum chamber can be secured as wide as possible.

In order to maintain the vacuum state in the vacuum chamber, it is important to keep a coupled state of the coupling part K1. However, when the coupling part K1 interferes with the peripheral part inside the heat insulating space, the joined state may be released. At this point, the peripheral part means all of various parts provided in the heat insulating space and, for example, the latch housing 23 embedded in the heat insulating space, the inner surface of the second door body 20, etc. may be understood as the peripheral part.

Therefore, in the embodiment, the coupling part K1 may have a gap space between the coupling part K1 and the peripheral part in order to prevent interference with the peripheral part. Looking at FIG. 9 that is an enlarged view showing part A in FIG. 8, a first gap space S1 is provided between the coupling part K1 and the latch housing 23. The first gap space S1 is a space formed between the latch housing 23 and the coupling part K1, the latch housing 23 and the coupling part K1 being spaced apart from each other by a predetermined distance.

However, when the latch housing 23 is omitted, there may be the first gap space S1 between one end extending from the first plate 21*a* constituting the second door body 20 and the coupling part K1. In other words, one end of the first plate 21*a* located in the filling space filled with the foam filled part F and the coupling part K1 are spaced apart from each other, thereby forming the first gap space S1.

In addition, the first gap space S1 that is a kind of an empty space may be filled with the foam filled part F. Therefore, it may be understood that at least a part of the edge of the vacuum insulation assembly 50 including the coupling part K1 is surrounded with the foam filled part F. As described above, the foam filled part F prevents the coupling part K1 from interfering with other parts inside the refrigerator door. Furthermore, the foam filled part F may serve to prevent the vacuum insulation assembly 50 from being shaken inside the sub door 1.

Furthermore, a connected portion between the first plate 21*a* and the second plate 21*b* that constitute the second door body 20 may be spaced apart from the second casing 53 of the vacuum insulation assembly 50. More precisely, the connected portion between the first plate 21*a* and the second plate 21*b* may be a kind of an edge, and this portion is a portion most protruding toward the vacuum insulation assembly 50. The connected portion between the first plate 21*a* and the second plate 21*b* is spaced apart from the first casing 51 of the vacuum insulation assembly 50, and a second gap space S2 is formed therebetween.

As described above, the first gap space S1 and the second gap space S2 may be empty spaces generated as the vacuum insulation assembly 50 and the peripheral part are spaced apart from each other. Furthermore, the first gap space S1 and the second gap space S2 may be filled with the foam filled part F. The foam filled part F allows the vacuum insulation assembly 50 to be spaced apart from the peripheral part, i.e., to maintain the first gap space S1 and the second gap space S2.

When the vacuum insulation assembly 50 is bent in a manufacturing process, or the vacuum insulation assembly 50 has the flat plate structure extending in one direction but the first door body 10 is formed in an entirely curved surface, the vacuum insulation assembly 50 and the first door body 10 may interfere with each other. However, in the embodiment, the first gap space S1 and the second gap space S2 are provided, interference between the vacuum insulation assembly 50 and the peripheral part may be prevented.

In the embodiment, the first gap space S1 may have a width larger than a width of the second gap space S2. The first gap space S1 is formed in a portion relatively closer to the edge of the vacuum insulation assembly 50 than the second gap space S2. In other words, the first gap space S1 is formed in a position close to the coupling part K1, and since the first gap space S1 is larger than the second gap space S2, a risk of interference between the coupling part K1 and the peripheral part (latch housing 23, etc.) may be more reduced.

At this point, (i) since the connected portion between the first plate 21*a* and the second plate 21*b* is closer to the front plate 11*a* of the first door body 10 than the latch housing 23, it may be understood that the first gap space S1 is closer than the second gap space S2, or (ii) the vacuum insulation assembly 50 is entirely bent, it may be understood that a distance in which the coupling part K1 that is the end of the vacuum insulation assembly 50 is spaced apart from the latch housing 23 increases.

Next, looking at a process of manufacturing the sub door 1. First, the vacuum insulation assembly 50 may be fixed to the inner surface of the first door body 10. As described above, fixation of the vacuum insulation assembly 50 may be performed by fixing the first casing 51 of the vacuum insulation assembly 50 on the inner surface of the front plate 11*a* of the first door body 10 by an adhesive tape, etc.

At this point, the vacuum insulation assembly 50 is in a formed state of the vacuum chamber therein. In other words, the vacuum insulation assembly 50 has the vacuum chamber between the first casing 51 and the second casing 53 and the radiant heat prevention part 55, 57, 59 is installed in the vacuum chamber. The radiant heat prevention part 55, 57, 59 may include the pair of spacers 57 and 59, and the radiant heat shield film 55 fixed between the pair of spacers 57 and 59.

Looking at a process of manufacturing the vacuum insulation assembly 50, first, after allowing the boss part 57*a* of the first spacer 57 to pass through the coupling hole 55*a* of the radiant heat shield film 55, the second spacer 59 is assembled at the opposite side at the same time. When the end of the boss part 57*a* is fitted inside the assembly groove 59*a* provided in the second spacer 59, the radiant heat shield film 55 is fixed between the first spacer 57 and the second spacer 59.

As described above, the burring part 55*a*' of the radiant heat shield film 55 may increase the contact area with the boss part 57*a* protruding on the first spacer 57, and then a movement of the radiant heat shield film 55 raised and lowered between the spacers 57 and 59 may be restricted. When the movement of the radiant heat shield film 55 is restricted, in a process in which the sub door 1 is opened and closed, noise generated when the radiant heat shield film 55 hits the pair of spacers 57 and 59, or noise generated when the radiant heat shield film 55 is bent itself can be prevented.

The first casing 51 and the second casing 53 may be assembled with each other with the radiant heat prevention part 55, 57, 59 located therebetween and an assembly therebetween may be performed by a welding method. When welding is performed along each of the external portions of the first casing 51 and the second casing 53, a welding portion may be the coupling part K1. In addition, the vacuum chamber is formed between the first casing 51 and the second casing 53.

At this point, looking at a process of forming the vacuum chamber inside the vacuum insulation assembly 50, a fluid existing in the vacuum chamber is discharged outward through the exhaust port 53*a* of the vacuum insulation assembly 50. In this vacuum exhaust stage, vacuum exhaust may be performed by inserting the vacuum insulation assembly 50 into a heating furnace. In this state, a leakage test may be performed to check whether or not leakage occurs in the vacuum chamber. When leakage is discovered in the leakage test, rework with respect to welding, etc. may be performed. After the vacuum insulation assembly 50 passes through the leakage test without a problem, the exhaust port 53*a* is pinched off to seal the vacuum chamber from the external space.

Figure 17:
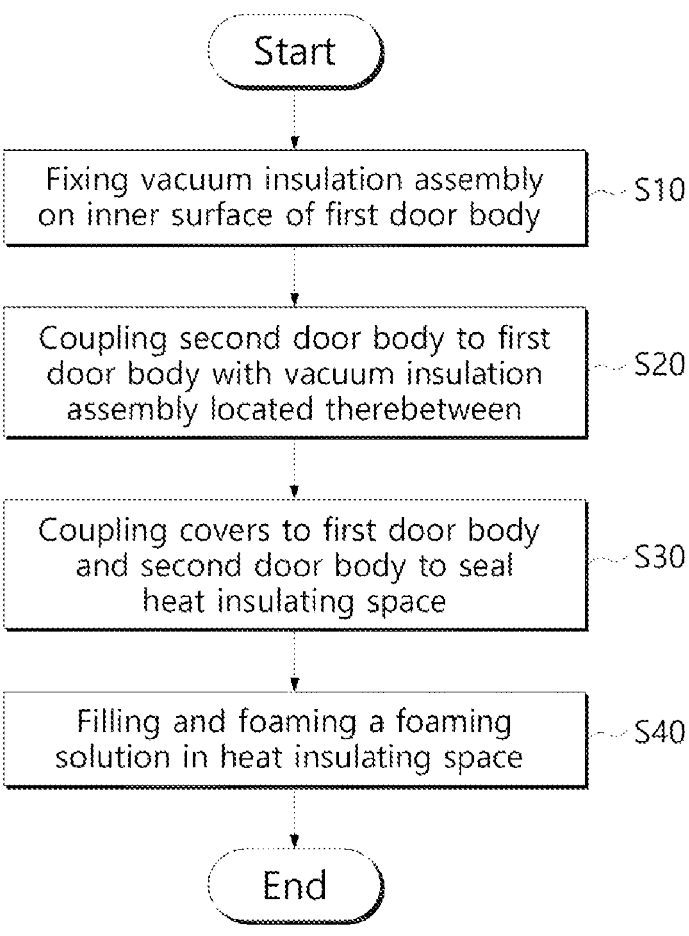
FIG. 17 is a flowchart showing a method for manufacturing the refrigerator door having the vacuum insulation assembly according to the present disclosure.

Looking at the process of manufacturing the sub door 1 again, as shown in FIG. 17, the vacuum insulation assembly 50 can be fixed to an inner surface of the first door body 10 (S10), and a state in which the second door body 20 is coupled to the first door body 10 while the vacuum insulation assembly 50 is fixed to the first door body 10 is continuously performed (S20). Then, the upper cover 30A and the lower cover 30B are respectively coupled to the upper portions and the lower portions of the first door body 10 and the second door body 20, the heat insulating space in which the vacuum insulation assembly 50 is installed may be sealed (S30). At this point, the assembly between the first door body 10 and the second door body 20 may be performed using a separate fastening tool.

Next, when the foaming solution is filled inside the heat insulating space and is foamed, the foam filled part F surrounding the edge of the vacuum insulation assembly 50 may be formed (S40). In this process, the foam filled part F serves to surround and fix an edge portion of the vacuum insulation assembly 50, specifically, the coupling part K1, naturally, so that even when a separate fixing device is not provided, the vacuum insulation assembly 50 can be securely fixed without interference with the peripheral part.

When the vacuum insulation assembly 50 is fixed by the foam filled part F, the coupling part K1 of the vacuum insulation assembly 50 may be maintained in a state of being spaced apart from the peripheral part. As described above, the foam filled part F prevents the coupling part K1 from interfering with other parts inside the refrigerator door. Furthermore, the foam filled part F may serve to prevent the vacuum insulation assembly 50 from being shaken inside the sub door 1.

Hereinabove, even though all components constituting the embodiment according to the present disclosure have been described as being combined or operated in combination as one, the present disclosure is not necessarily limited to the embodiment. In other words, within the scope of the purpose of the present disclosure, one or more parts of all the parts may be selectively coupled to each other to be operated. Furthermore, it will be further understood that the terms "include", "comprise" "have", etc. described in this specification, should be interpreted as having the presence of the components unless the context clearly indicates otherwise, but other components are not excluded, and are further included. Unless otherwise defined, all terms which include technical and scientific terms, used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The invention claimed is:

1. A refrigerator door comprising:

a first door body;

a second door body coupled to the first door body to form a heat insulating space between the first door body and the second door body, the first door body and the second door body defining an exterior of the refrigerator door;

a vacuum insulation assembly provided inside the heat insulating space, the vacuum insulation assembly having a sealed vacuum chamber; and a foam filled part provided inside the heat insulating space and surrounding at least a portion of an edge of the vacuum insulation assembly, wherein the vacuum insulation assembly includes:

a coupling part provided along the edge of the vacuum insulation assembly to maintain a vacuum state in the sealed vacuum chamber of the vacuum insulation assembly;

a first casing facing the first door body; and a second casing coupled to the first casing to form the sealed vacuum chamber between the first casing and the second casing, the second casing facing the second door body, wherein the coupling part is surrounded by the foam filled part while being spaced apart from a peripheral part inside the heat insulating space, wherein a gap space is formed between the coupling part and the heat insulating space, wherein the coupling part couples an edge of the first casing to an edge of the second casing, wherein the second door body includes:

a first plate defining a side surface of a storage space; and a second plate connected to the first plate and defining a rear surface of the storage space, the second plate facing the vacuum insulation assembly, wherein a first end of the second door body extends from the first plate and is located in a filling space provided with the foam filled part, and wherein a first gap space is formed between the coupling part and the first end of the second door body.

2. The refrigerator door of claim 1, wherein the refrigerator door is attached to a refrigerator, wherein the second door body includes:

the storage space formed in a direction towards a storage compartment of the refrigerator; and a dyke part protruding from a lower portion of the second door body and defining a bottom of the storage space, and wherein at least a portion of the dyke part is overlapped with a frame of the refrigerator or a main door of the refrigerator.

3. The refrigerator door of claim 2, further comprising a gasket provided between the second door body and the frame of the refrigerator or between the second door body and the main door, wherein an end of the dyke part protrudes more towards the storage space than the gasket.

4. The refrigerator door of claim 2, wherein the dyke part extends to the side surface of the storage space.

5. The refrigerator door of claim 1, wherein the vacuum insulation assembly further includes:

a radiant heat shield film provided inside the sealed vacuum chamber, the radiant heat shield film having a coupling hole; and a pair of spacers respectively provided at opposite sides of the radiant heat shield film, the pair of spacers being assembled to each other through the coupling hole to allow the radiant heat shield film to be spaced apart from both of the first casing and the second casing.

6. The refrigerator door of claim 1, wherein a portion where the first plate and the second plate are connected to each other is spaced apart from the second casing of the vacuum insulation assembly to form a second gap space between the second casing and the portion where the first plate and the second plate are connected to each other, and wherein a width of the first gap space is larger than a width of the second gap space.

7. The refrigerator door of claim 1, wherein the first casing is fixed to an inner surface of the first door body, and wherein the coupling part is provided on the edge of the first casing spaced apart from the inner surface of the first door body.

8. The refrigerator door of claim 5, wherein the pair of spacers comprise:

a first spacer on which a boss part protrudes and passes through the coupling hole; and a second spacer having an assembly groove, wherein an end of the boss part that passes through the coupling hole is coupled to the assembly groove of the second spacer, and wherein the boss part has a width widening gradually toward a surface of the first spacer.

9. The refrigerator door of claim 8, wherein the radiant heat shield film includes a burring part formed along a rim of the coupling hole, and wherein the burring part extends in a longitudinal direction of the boss part to cover a surface of the boss part.

10. The refrigerator door of claim 8, wherein the second spacer includes a flange part protruding in a direction of the first spacer, wherein the assembly groove is formed inside the flange part, and wherein an external diameter of the flange part is larger than an internal diameter of the coupling hole.

11. The refrigerator door of claim 5, wherein the radiant heat shield film includes a bead part protruding in a direction of an inner surface of the first casing or an inner surface of the second casing.

12. The refrigerator door of claim 1, further comprising an exhaust port connected to the vacuum insulation assembly to connect the sealed vacuum chamber to an external space, wherein an end of the exhaust port is received in the second door body or is surrounded by the foam filled part.

13. A refrigerator comprising:

a cabinet;

a main door rotatably provided on the cabinet; and a sub door provided on the cabinet and rotatable independently from the main door, the sub door being connected to a storage compartment of the cabinet through the main door when opened, the sub door including:

a first door body;

a second door body coupled to the first door body to form a heat insulating space between the first door body and the second door body, the first door body and the second door body defining an exterior of the sub door;

a vacuum insulation assembly provided inside the heat insulating space, the vacuum insulation assembly having a sealed vacuum chamber; and a foam filled part provided inside the heat insulating space and surrounding at least a portion of an edge of the vacuum insulation assembly, wherein the vacuum insulation assembly includes:

a coupling part provided along the edge of the vacuum insulation assembly to maintain a vacuum state in the sealed vacuum chamber of the vacuum insulation assembly;

a first casing facing the first door body; and a second casing coupled to the first casing to form the sealed vacuum chamber between the first casing and the second casing, the second casing facing the second door body, wherein the coupling part is surrounded by the foam filled part while being spaced apart from a peripheral part inside the heat insulating space, wherein a gap space is formed between the coupling part and the heat insulating space, wherein the coupling part couples an edge of the first casing to an edge of the second casing, wherein the second door body includes:

a first plate defining a side surface of a storage space; and a second plate connected to the first plate and defining a rear surface of the storage space, the second plate facing the vacuum insulation assembly, wherein a first end of the second door body extends from the first plate and is located in a filling space provided with the foam filled part, and wherein a first gap space is formed between the coupling part and the first end of the second door body.

14. The refrigerator of claim 13, further comprising a gasket provided between the main door and the sub door, wherein the second door body further includes:

the storage space formed in a direction towards the storage compartment of the cabinet; and a dyke part protruding from a lower portion of the second door body and defining a bottom of the storage space, wherein the dyke part blocks a space between the main door and the sub door, and wherein the gasket is disposed in the space between the main door and the sub door.

* * * * *